Nov. 1, 1932. A. J. DOWNER 1,885,593
UNDER PRESSURE FAUCET AND VALVE TOOL
Filed June 6, 1931
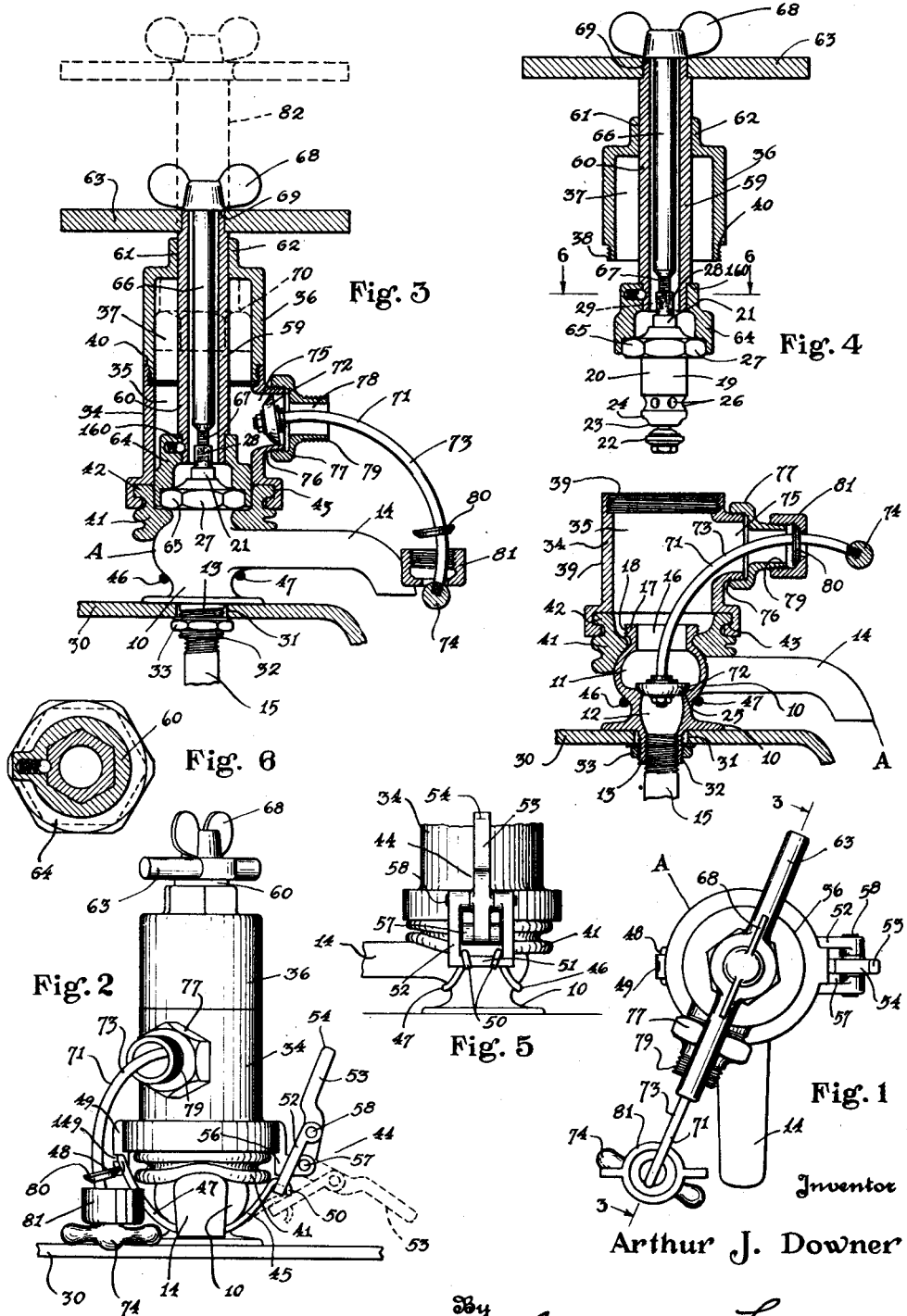
Inventor
Arthur J. Downer Patented Nov. 1, 1932

1,885,593

UNITED STATES PATENT OFFICE

ARTHUR J. DOWNER, OF MINNEAPOLIS, MINNESOTA

UNDER PRESSURE FAUCET AND VALVE TOOL

Application filed June 6, 1931. Serial No. 542,532.

Certain types of faucets, valves and similar devices are constructed with a hollow body having an opening therein and with a core member including a valve head insertable into said hollow body therethrough. Such valves are usually provided with caps threaded to the body to close the opening therein and the core member of such valve is constructed with a stem for operating the valve, which extends through the cap.

My invention relates to tools for removing the cores and caps of such valves and particularly without removal of the valve from the installation in which it is employed and while the valve is under pressure.

An object of the invention resides in providing a valve tool including a housing adapted to enclose the opening in the valve body and the valve cap covering the same, together with the protruding portion of the valve stem and in further providing means in the nature of a gasket for engagement with the valve body and carried by said housing for effecting a water tight connection therebetween.

A still further object of the invention resides in providing a member for engagement with the valve cap to remove the same from the valve body, said member being operable from without said housing.

A feature of the invention resides in providing another member for engagement with the valve stem of the valve core for removing the same from said valve body, said member being also operable from without the housing.

Another object of the invention resides in constructing said housing with a chamber therein and in forming said members movable so as to move the valve cap and valve core away from the valve body and into said chamber.

An object of the invention resides in constructing one of said members with a tube slidably and rotatably mounted in said housing and in constructing the other of said members with a spindle slidable and rotatable within said tube.

Another object of the invention resides in providing the housing with a cap and in mounting said sleeve and tube in said cap so that the valve cap and core may be removed from the housing upon removal of said housing cap from the housing.

An object of the invention resides in constructing said tube with a socket wrench adapted to engage the valve cap and to remove the same upon rotation of said tube.

A feature of the invention resides in constructing said spindle with a threaded stud adapted to screw into the valve stem.

Another feature of the invention resides in constructing said spindle with a shoulder adapted to engage said sleeve so that said valve core and cap may be clamped together and simultaneously removed from the valve body.

Another object of the invention resides in providing a valve for obstructing the flow of fluid into the chamber in said housing after the valve core has been withdrawn from the valve body and moved into such chamber.

An object of the invention resides in constructing the housing with an auxiliary valve adapted to be moved into engagement with the valve seat of the valve proper after the valve core has been removed from the body of the valve.

A feature of the invention resides in providing means for guiding the auxiliary valve for movement through an arc of a circle to move the same into operative or inoperative position.

Another feature of the invention resides in constructing the auxiliary valve with an arcuate valve stem passing through an opening in the housing whereby said valve may be moved from one position to the other.

A still further object of the invention resides in providing a clamp attached to said housing and engageable with the valve body to force the gasket into engagement with the valve body.

Other objects of the invention reside in the novel combination and arrangement of parts and in the details of construction hereinafter illustrated and/or described.

In the drawing:

Fig. 1 is a plan view of a valve tool illustrating an embodiment of my invention applied to a water faucet.

Fig. 2 is a front elevational view of the structure shown in Fig. 1.

Fig. 3 is an elevational sectional view of the structure shown in Fig. 1, taken on line 3—3 of Fig. 1.

Fig. 4 is a view similar to Fig. 1 showing the valve core removed from the faucet and the auxiliary valve obstructing the flow of water from the faucet.

Fig. 5 is a fragmentary elevational view illustrating the clamp used for attaching the housing to the body of the faucet.

Fig. 6 is a plan sectional view taken on line 6—6 of Fig. 4.

In the removal of valve cores from faucets, globe valves and similar valves, it has heretofore been necessary to shut off the fluid supply and relieve the pressure at the valve before such valve core could be removed. This would require additional shut off devices and where such shut off devices were not employed, it would mean the closing off of the entire fluid supply for the system in which the valve or faucet was employed. The present invention provides a tool by means of which the valve core may be removed from the faucet or valve without shutting off the fluid supply and while the valve is under pressure, and by which the flow of fluid through the valve is temporarily cut off, during the repair or inspection of the valve core.

For the purpose of illustrating the application of my invention, I have shown in the drawing, a water faucet which I have indicated in its entirety at A. This faucet, forming no particular feature of the invention is merely shown for the purpose of illustration and has not been illustrated in detail. It will however become readily apparent that the invention is equally as well applicable to other types of valves.

The faucet A comprises a body 10 which is formed with a chamber 11 within the interior thereof, which communicates with a passageway 12 in a neck 13 on said body. The body 10 has formed on it, a water spout 14 which is in communication with the chamber 11 and through which the water or other fluid to be controlled by the faucet is discharged therefrom when the faucet is in operation. The neck 13 is threaded to receive a pipe 15 by means of which fluid under pressure is conducted to the faucet. The chamber 11 communicates with the exterior through an opening 16 and the body 10 is provided with a flange 17 surrounding this opening, which flange is threaded externally as indicated at 18.

Within the valve body 10 and in the chamber 11 is mounted a valve core 19. This valve core includes a member 20 which may be inserted into the chamber 11 through the opening 16 thereon. Within the member 20 is mounted a valve stem 21 which is screwed in said member and is adapted to be raised and lowered with respect thereto upon rotation of said stem. This valve stem has secured to the lower end thereof, a valve head 22, which is adapted to seat against a seat 23 formed in the lower end of member 20. The member 20 is further formed with an annular seat 24, disposed above the seat 23, which is adapted to seat against a seat 25 formed in the body 10 and situated between the chamber 11 and the passageway 12 in the neck 13 of said body. When the member 20 is inserted through the opening 16 and into the chamber 11, the seat 24 seats against the seat 25 forming a fluid tight connection between said member 20 and the body proper. The member 20 is made hollow and is formed with an opening encircling the valve stem 21 near the valve head 22, which communicates with the interior thereof. The interior of this member is further brought in communication with the chamber 11 through a series of openings 26 disposed circumferentially about the same. When the member 20 is inserted within the body 10 and the seat 24 thereof, held against the seat 25, communication from the passageway 12 from the chamber 11 may be opened or closed through the valve head 22, which is movable toward and from the valve seat 23 upon rotation of the valve stem 21.

The member 20 is held in position within the body 10 of valve A through a cap 27. This cap is provided with a portion 65 serving as a nut and is threaded to screw upon the threads 18 of the body 10. Cap 27 is provided with a gasket forming a stuffing box about the valve stem 21 whereby a fluid tight connection is formed between the valve stem and the interior of the valve proper. When the cap 27 has been screwed down, the faucet may be operated through the valve stem 21 in the usual manner. The valve stem 21 is provided with a square head 28 at the end of the same to receive a suitable handle (not shown). The valve stem 21 is threaded as indicated at 29 to receive a screw whereby the handle for operating the same may be attached to the valve stem. Upon rotation of this handle, the faucet may be opened or closed as desired.

The faucet A is secured to the lavatory or other fixture with which it is to be used in the customary manner. For the purpose of illustration, a portion of a lavatory has been shown which is designated by the reference numeral 30. The neck 13 extends through an opening 31 in the lavatory and is externally threaded as indicated at 32 to receive a jamb nut 33 by means of which the valve proper may be held secured to the fixture proper.

My invention proper consists of a housing 34, formed with a chamber 35 within the same. This housing is open at both ends and is adapted to be closed at its upper end through a hollow cap 36, similarly constructed with a chamber 37 in it. The two chambers 35 and 37 are preferably arranged in continuation of one another so that when the cap 36 is attached to the housing 34, one large chamber is formed within which the valve core is drawn. The cap 36 may be secured to the housing 34 in any suitable manner. For the purpose of illustration, the cap 36 is shown externally threaded as at 38, to screw into internal threads 39 in the upper end of housing 34. A shoulder 40 may be formed on the cap 36 to seat against the end of the housing 34 so that a tight joint may be formed between the cap and housing when the cap is applied thereto.

The housing 34 is adapted to be secured to the faucet A and to form a fluid tight connection therewith. For this purpose, a highly compressible rubber or similar gasket 41 is employed which is annular in form and which is adapted to fit about the body 10 of the faucet proper and to seat against the flaring portion of the same. This gasket is constructed with an outwardly extending flange 42, adapted to be received within a groove 43 in the lower portion of the housing 34 and to be held in place therein through its own resiliency. When the housing 34 is applied to the faucet, the same takes the position shown in Figs. 3 and 4 and the gasket 41 becomes compressed to snugly fit about the body of the valve and effect a fluid tight closure between the housing and faucet. It will be noted that the parts are so constructed and proportioned that when the device is applied, cap 27 becomes disposed within the chamber 35 of housing 34 where the same may be detached and removed from the valve body as will be presently described in detail.

For the purpose of securing the housing to the faucet, a clamp is employed which is indicated in its entirety by the reference numeral 44. This clamp comprises a U-shaped yoke 45 formed with two spaced arms 46 and 47 connected together at one end through a portion 48. The portion 48 of yoke 45 is hooked in an outwardly opening slot 149 formed in an ear 49 on the housing 34 at the lowermost portion thereof. This construction serves as a hinge whereby the yoke 45 may be swung about the body 10 of the faucet A to permit of the attachment of the device thereto. The extreme ends of the arms 46 and 47 of yoke 45 are formed with hooks 50 which are adapted to engage a bar 51 formed on a chain link 52. The link 52 is pivoted through a pin 58 to a lever 53 having a finger piece 54, which lever in turn is pivoted through a pin 57 to an ear 56, said ear being disposed on the housing 34 opposite the ear 49. When the lever 53 is swung into the position shown in dotted lines in Fig. 2, the link 52 may be linked about the two hooks 50 on the yoke 45. When this lever is raised, the yoke 45 is drawn about the body of the faucet, causing the gasket 41 to be pressed firmly against the same to form a fluid tight connection between the faucet proper and the valve tool. When the pivot 58 of link 52 reaches an over-centered position with respect to the pivot 57 of said link, the clamp 44 becomes latched in position and so remains until manually released. Due to the construction of the slot 149, the yoke 45 may be readily removed and other sizes of yoke used in place thereof, so that the device may be readily attached to any form or size of faucet or valve.

My invention further comprises an extricator 59, by means of which the valve core 19 and the cap 27 of the faucet may be disengaged from the faucet and bodily removed therefrom. This extricator is operable from the exterior of the tool and while the valve is under pressure. Extricator 59 comprises a tube or sleeve 60 which is rotatably and slidably mounted in a bore 61 formed in a boss 62 on the cap 36 of the tool proper. The sleeve 60 has attached to the protruding end thereof, a handle 63, by means of which the same may be both rotated and reciprocated within the bore 61. At the other end of the sleeve 60 is formed a socket wrench 64 which is adapted to fit over the portion 65 of the cap 27, which serves as a nut for unscrewing the same. This wrench is preferably of such a size so that the same engages the wall of the chambers 35 and 37 of the tool so that the sleeve 60 is guided both at its upper and lower ends during the operation thereof. For the purpose of attaching the wrench to the sleeve 60, said sleeve is formed with a number of sides parallel to the axis thereof and the wrench constructed to fit over the same as is now well known in the art. The wrench 64 is spring held in place upon the sleeve 60 and is adapted to engage a shoulder 160 thereon.

Within the sleeve 60 is rotatably and slidably mounted a spindle 66. This spindle is formed at its inner end with a threaded stud 67 adapted to screw into the threads 29 in the valve stem 21. The other end of the said spindle is provided with a thumb engaging head 68, by means of which said spindle may be rotated. When the spindle 66 is screwed into the threads 27 of the valve stem 21, a shoulder 69 formed on the head 68 engages the end of the sleeve 60 and forces the wrench 64 tight against the cap 27. When the sleeve 60 is rotated through the handle 63, the cap 27 is unscrewed and the core of the valve, together with said cap are simultaneously removed from the valve body proper. After removal of the same, the extricator 59 may be slid along the core 61 so that the socket wrench 64 takes the position shown in dotted lines at 70 in Fig. 3. When so disposed, the valve core and cap are completely removed from the valve body and become disposed at a position remote therefrom.

For the purpose of preventing the flow of water through the valve or through the faucet upon removal of the valve core and cap therefrom, an auxiliary valve is employed which I have indicated in its entirety at 71. This valve comprises a valve head 72 adapted to seat against the seat 25 in the valve body 10. The valve head 72 is mounted on an arcuate valve stem 73 which is formed with a handle 74 at the free end thereof. The stem 73 is movable along an opening 75 in a boss 76 formed on the side of the housing 34, and may be moved from a position shown in Fig. 3 in which the valve head 72 is retained within said opening to a position shown in Fig. 4 in which the valve head 72 is seated against the valve seat 25. The valve head 72 is prevented from being withdrawn from the device through the opening 75 by means of a cap 77 which is threaded upon the exterior of the boss 76. This cap is formed with an opening 78 lying in continuation of the opening 75 and is provided with a threaded neck 79. The opening 78 is somewhat smaller than the diameter of the valve head 72 so that said valve head is prevented from being withdrawn from the device as long as the cap 77 is applied thereto In order to hold the valve head 72 against the seat 25, the valve stem 73 is provided with a disc 80 which is welded or otherwise rigidly secured thereto. A second cap 81 encircling the valve stem 73 at a locality between the disc 80 and the handle 74 is adapted to screw upon the threaded neck 79 of cap 77 and to force the disc 80 toward the said neck. This causes the valve head 72 to be forced against the seat 25 to form a fluid tight connection therewith. When the valve 72 is properly applied to the faucet A, the cap 36 and appended parts may be readily removed therefrom as shown in Fig. 4.

The invention is used as follows: When it is desired to remove the core and valve cap from the body of a faucet, the handle of the valve stem is first removed by unscrewing the screw holding the same in place. The housing valve head 72 is first drawn into the opening 75 provided for the reception of the same and the housing 34 with the cap 36 attached thereto is then applied to the valve body 10 so as to cause the wrench 64 to engage the nut 65 and the gasket 41 to seat against said valve body. Clamp 44 is next applied, the yoke 45 being placed beneath the valve body and the hooks 50 thereof engaged with the link 52. Lever 53 is next moved from its position shown in dotted lines in Fig. 2 to its full line position, which causes the yoke 45 to be tightly drawn about the valve body and the housing 34 to be firmly attached thereto. The gasket 41 becomes compressed to form a fluid tight connection between said housing and valve. The spindle 66 is next lowered and the stud 67 thereof screwed into the threads 29 of the valve stem 21. The stud 67 is of such a length that the shoulder 69 formed on the thumb piece 68 will engage the end of the sleeve 60 before the said stud reaches the ends of said threads. This causes the socket wrench 64 to be firmly seated against the nut 65 and the core 20 to be drawn tightly against the cap 27. When the parts are so applied, the entire extricator 59 may be rotated by turning the handle 63. This unscrews the cap 27 from the threads 18 on the neck 17 of the valve body 11. At the same time the core 20 is moved together with said cap and the two bodily disengaged from the valve body. After the valve core 19 has been loosened, the extricator 59 is slid bodily upwardly to a position indicated at 82 in dotted lines in Fig. 3. Water or other fluid controlled by the faucet A then flows through the spout 14 which is fully open. As soon as the valve core is out of the way, the valve stem 73 is moved inwardly along the two openings 75 and 78 and the valve head 72 caused to seat against the seat 25 of the faucet proper. This checks the flow of water through the faucet. While so held through the handle 74, the cap 81 is applied to the neck 77 and the disc 80 forced inwardly toward the housing, which has the effect of forcing the valve head 72 against its seat and completely stopping the flow of water or other fluid through the faucet. After the flow of water has been stopped, the cap 36 may be removed as shown in Fig. 4 with the valve core 20 and the cap 27 carried by the extricator 59. Where minor repairs are required the same may be made while the parts are held mounted upon the extricator. Where replacements are required the parts can of course be detached therefrom and new parts substituted.

In the replacing of the valve core and valve cap in the valve, the reverse procedure is adopted. The cap 27 and core 20 are reattached to the extricator, if previously detached, in exactly the same manner as for the removal of the device and the extricator moved to its uppermost position with respect to the cap 36. This cap is then screwed into the threads 39 to firmly attach the same to the housing 34. Cap 81 is then loosened and the valve 71 moved to the position shown in Fig. 3. The valve core and valve cap may then be moved into normal position and the cap 27 screwed upon the threads 18 of the valve body. This is accomplished by turning the handle 63 attached to sleeve 60. When the valve core and valve cap have been properly applied, the flow of water occurring during the disengagement of the valve head 72 from the valve seat 25 is stopped and the entire tool may be removed from the faucet. Thereafter the handle may be applied to the valve stem 21 and the faucet is then in condition to be used in the intended manner.

Although I have described my invention as employed in the removal of the core and cap of a faucet, it can readily be comprehended that the same may be used for the removal of valve heads or cores of globe valves and other similar valves. In such case, water escapes during the manipulation of the device through the opening 78 of the cap 77, whereas when used with faucets, water will escape principally from the spout 14 thereof. Although I have shown the valve stem 73 more or less free to move within the opening 78, it can readily be comprehended that the same may be guided so as to move in a more precise relation with respect to the valve seat in the faucet. The spindle 66 is removable from the sleeve 60 so that spindles with other sizes of studs may be replaced therein and likewise different sizes of socket wrenches may be used. By means of this construction, the invention may be used with various types and sizes of valves or faucets so that a separate device is not needed for each type and size of faucet. In the use of my invention, I have described the method employed in which the opening 78 and the spout 14 of the faucet are left open while the core is being removed and the valve head 72 applied. If desired, the space 78 may be reduced in size and the spout 14 temporarily plugged to prevent the leakage of water therefrom during such change. However, with the spout 14 open, the change can be made so quickly that very little inconvenience is encountered during the closing of the faucet by the valve 72.

My invention is highly advantageous in that an extremely simple and efficient device is produced whereby valve heads and cores of faucets, valves and similar structures may be removed while such valves and faucets are under pressure. The device may be applied to the valve body, the valve or faucet body, quickly and without difficulty. The valve cores, or heads, may be rapidly removed or replaced so that considerable time is saved and so that a minimum loss of fluid occurs. The device may be used with different types and sizes of valves and faucets. The device is fool proof and will not readily get out of order.

Changes in the specific form of my invention as herein disclosed may be made within the scope of what is claimed, without departing from the spirit of my invention.

Having described my invention, what I claim as new and desire to protect by Letters Patent is:

1. An assembling and dissembling device for valves including a chambered body formed with a valve seat and an opening communicating with the chamber therein and a core mounted in said chamber having a valve head adapted to seat against said seat and removable from said body through said opening, said device comprising a housing applicable to the valve body and adapted to enclose the opening therein, said housing having a chamber therein, a member within said housing for engagement with the valve core and operable from without said housing to disengage said valve core from said body, said member being movable to withdraw the valve core from the valve body and into said chamber and an auxiliary valve member carried by said housing and operable from without said housing for engagement with the seat of said body to obstruct the flow of fluid into said chamber after the valve core has been removed from the valve body.

2. An assembling and dissembling device for valves including a chambered body formed with an opening, a core mounted therein and removable from said body through said opening and a cap for closing said opening, said device comprising a housing applicable to the valve body and adapted to enclose the opening therein and said cap, a member within said housing for engagement with the valve core, another member within said housing for engagement with the valve cap, said members being both operable from without the housing to remove the valve core and cap from the valve body, said members being movable with the valve core and cap away from the valve body and means operable to obstruct the flow of fluid through said valve after the valve core has been removed therefrom.

3. An assembling and dissembling device for valves including a chambered body formed with an opening, a cap for closing said opening, a core mounted in said chambered body and removable from said body through said opening and having a valve stem projecting through said cap, said device comprising a housing applicable to the body of the valve and adapted to enclose the opening therein and said cap, a member within said housing for engagement with said valve stem, another member within said housing for engagement with the valve cap, said members being both operable from without the housing to remove the valve core and cap from the valve body, said members being jointly movable with the valve core and cap away from the valve body and means operable to obstruct the flow of fluid through said valve after the core has been removed therefrom.

4. An assembling and dissembling device for valves including a chambered body formed with an opening, a cap for closing said opening, a core mounted in said chambered body and removable from said body through said opening and having a valve stem projecting through said cap, said device comprising a housing applicable to the body of the valve and adapted to enclose the opening therein and said cap, a member within said housing for engagement with said valve stem, another member within said housing for engagement with said valve stem, another member within said housing for engagement with the valve cap, said members being independently operable from without the housing to engage the valve stem and cap and being jointly movable to simultaneously remove the valve cap and core from the valve and away from the valve body and means operable to obstruct the flow of fluid through said valve after the valve core has been removed therefrom.

5. An assembling and dissembling device for valves including a chambered body formed with an opening, a cap for closing said opening, a core mounted in said chambered body and removable from said body through said opening and having a valve stem projecting through said cap, said device comprising a housing applicable to the body of the valve and adapted to enclose the opening therein and said cap, a tubular member rotatably and slidably mounted within said housing and operable from without the same, means on said tubular member for engagement with the cap of said valve, a spindle rotatably and slidably mounted in said tubular member and operable from without said housing, means on the end of said spindle for engagement with the valve stem of the valve core, said spindle and tubular member being jointly operable to remove the valve cap and valve core from the valve body and to move the same away from the valve body, and means operable to obstruct the flow of fluid through said valve after the valve core has been removed therefrom.

6. An assembling and dissembling device for valves including a chambered body formed with an opening, a cap for closing said opening, a core mounted within said chambered body and removable from said body through said opening and having a valve stem projecting through said cap, said device comprising a housing applicable to the body of the valve and adapted to enclose the opening therein and said cap, a cap detachably secured to said housing, a tubular member slidably and rotatably mounted in said last named cap and operable from without said housing, a spindle slidably and rotatably mounted within said tubular member and operable from without said housing, means on one thereof for engagement with the cap of the valve body, means on the other thereof for engagement with the valve stem of the valve core, said members being jointly operable to remove the valve core and cap from the valve body and to move the same away from the valve body and means operable to obstruct the flow of fluid through said valve after the valve core has been removed therefrom, the cap of said housing being movable away from said housing to give access to the valve core.

7. An assembling and dissembling device for valves including a chambered body formed with a valve seat and an opening communicating with the chamber therein and a core mounted in said chamber having a valve head adapted to seat against said seat and removable from said body through said opening, said device comprising a housing applicable to the valve body and adapted to enclose the opening therein, said housing having a chamber therein, a member within said housing for engagement with the valve core and operable from without said housing to disengage said valve core from said body, said member being movable to withdraw the valve core from the valve body and into said chamber, an auxiliary valve member for engagement with said seat and means for guiding said valve for arcuate movement from a position in engagement with said seat to a position away from the path of movement of said core.

8. An assembling and dissembling device for valves including a chambered body formed with a valve seat and an opening communicating with the chamber therein and a core mounted in said chamber having a valve head adapted to seat against said seat and removable from said body through said opening, said device comprising a housing applicable to the valve body and adapted to enclose the opening therein, said housing having a chamber therein, a member within said housing for engagement with the valve core and operable from without said housing to disengage said valve core from said body, said member being movable to withdraw the valve core from the valve body and into said chamber, an auxiliary valve member, an arcuate valve stem secured to said valve member, said housing having an opening therein through which said valve stem extends and from which the same may be manipulated from the exterior of the housing and means for holding said valve in engagement with the valve seat in the body of the valve.

9. An assembling and dissembling device for valves including a chambered body formed with an opening, a core mounted therein and removable from said body through said opening and a cap for closing said opening, a housing applicable to the valve body and adapted to enclose the opening therein and said cap, a member within said housing for engagement with the valve core, another member within said housing for engagement with the valve cap, said members extending through the housing, and separate means on each of said members for procuring independent movement thereof from without the housing and means operable to obstruct the flow of fluid through said valve after the valve core has been removed therefrom.

10. An assembling and dissembling device for valves including a chambered body formed with an opening and a core mounted therein and removable from said body through said opening, said device comprising a housing applicable to the valve body and adapted to enclose the opening therein, a member within said housing for engagement with the valve core and operable from without said housing to remove the same from the valve body, said member being movable together with the valve core away from the valve body, means operable from without said housing for locking said member to said core and means operable to obstruct the flow of fluid through said valve after the valve core has been removed therefrom.

11. An assembling and dissembling device for valves including a chambered body formed with an opening, a core mounted therein and removable from said body through said opening and a cap for closing said opening, a housing applicable to the valve body and adapted to enclose the opening therein and said cap, a member within said housing for engagement with said cap and operable from without the housing to remove the cap from the valve body, means movable with said member for engagement with the valve core to cause the simultaneous removal of the cap and core, and means operable to obstruct the flow of fluid through said valve after the valve core has been removed therefrom.

12. An assembling and dissembling device for valves including a chambered body formed with an opening, a core mounted therein and removable from said body through said opening and a cap for closing said opening, a housing applicable to the valve body and adapted to enclose the opening therein and said cap, a member within said housing for engagement with the valve core, and operable from without the housing to remove the valve core from the valve body, means movable with said member for engagement with the cap to cause the simultaneous removal of the cap and core, and means operable to obstruct the flow of fluid through said valve after the valve core has been removed therefrom.

13. An assembling and dissembling device for valves including a chambered body formed with an opening, a core mounted therein and removable from said body through said opening and a cap for closing said opening, a housing applicable to the valve body and adapted to enclose the opening therein and said cap, a member within said housing for engagement with the valve core, another member within said housing for engagement with the valve cap, concentric members extending through said housing for operating said core and cap engaging members, and means operable to obstruct the flow of fluid through said valve after the valve core has been removed therefrom.

14. An assembling and dissembling device for valves including a chambered body formed with a valve seat and an opening communicating with the chamber therein and a core mounted in said chamber having a valve head adapted to seat against said seat and removable from said body through said opening, a housing applicable to the valve body and adapted to enclose the opening therein, said housing having a chamber therein, a member within said housing for engagement with the valve core and operable from without said housing to disengage said valve core from said body, said member being movable to withdraw the valve core from the valve body and into said chamber, an auxiliary valve member for engagement with said seat and means for guiding said valve member for movement from a position in engagement with said seat to a position away from the path of movement of said core.

In testimony whereof I have affixed my signature.

ARTHUR J. DOWNER.